United States Patent
Hishinuma

(10) Patent No.: US 9,377,810 B2
(45) Date of Patent: Jun. 28, 2016

(54) ELECTRONIC DEVICE

(71) Applicant: CASIO COMPUTER CO., LTD., Tokyo (JP)

(72) Inventor: Shinsuke Hishinuma, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 138 days.

(21) Appl. No.: 13/937,484

(22) Filed: Jul. 9, 2013

(65) Prior Publication Data

US 2014/0029197 A1  Jan. 30, 2014

(30) Foreign Application Priority Data

Jul. 26, 2012 (JP) ................. 2012-165362

(51) Int. Cl.
*G06F 1/16* (2006.01)
*H04B 1/3888* (2015.01)

(52) U.S. Cl.
CPC ............ *G06F 1/1613* (2013.01); *G06F 1/1626* (2013.01); *G06F 1/1628* (2013.01); *G06F 2200/1633* (2013.01); *H04B 1/3888* (2013.01)

(58) Field of Classification Search
CPC ............ H04B 1/3888; A45C 2011/003; G06F 1/1613; G06F 1/1628; G06F 1/1632
USPC .......... 361/679.55, 679.56; 455/575.1, 575.8; 206/45.2
See application file for complete search history.

(56) References Cited

U.S. PATENT DOCUMENTS

| | | | | |
|---|---|---|---|---|
| 5,607,135 | A * | 3/1997 | Yamada | A47B 23/043 248/447 |
| 6,903,927 | B2 * | 6/2005 | Anlauff | 361/679.28 |
| 6,967,836 | B2 * | 11/2005 | Huang et al. | 361/679.46 |
| 6,971,622 | B2 * | 12/2005 | Ziegler et al. | 248/454 |
| 7,184,263 | B1 * | 2/2007 | Maskatia | 361/679.27 |
| 7,239,505 | B2 * | 7/2007 | Keely et al. | 361/679.09 |
| 7,414,833 | B2 | 8/2008 | Kittayapong | |
| 7,561,415 | B2 * | 7/2009 | Liou et al. | 361/679.26 |
| 7,735,644 | B2 * | 6/2010 | Sirichai et al. | 206/320 |
| D626,964 | S * | 11/2010 | Richardson et al. | D14/447 |
| 8,077,151 | B2 * | 12/2011 | Morooka | 345/168 |
| D658,168 | S * | 4/2012 | Werth | D14/253 |
| D659,147 | S * | 5/2012 | Hu et al. | D14/447 |
| 8,248,791 | B2 * | 8/2012 | Wang et al. | 361/679.59 |

(Continued)

FOREIGN PATENT DOCUMENTS

| | | |
|---|---|---|
| CN | 201718671 U | 1/2011 |
| JP | 06338837 A | 12/1994 |

(Continued)

OTHER PUBLICATIONS

Japanese Office Action (and English translation thereof) dated Aug. 20, 2015, issued in counterpart Japanese Application No. 2012-165362.

(Continued)

*Primary Examiner* — Adrian S Wilson
(74) *Attorney, Agent, or Firm* — Holtz, Holtz & Volek PC

(57) ABSTRACT

An electronic device of the present invention includes a cover body which openably and closably covers the front surface of a flat-type device body, a support section which is capable of being stood up and laid down and mounted on the cover body, and a mount section which is bendably provided to the support section and mounted on the device body.

5 Claims, 10 Drawing Sheets

(56) References Cited

U.S. PATENT DOCUMENTS

| | | | |
|---|---|---|---|
| 8,328,008 B2* | 12/2012 | Diebel et al. | 206/45.24 |
| D676,853 S* | 2/2013 | Gengler | D14/447 |
| D679,700 S* | 4/2013 | Werth | D14/253 |
| 8,464,995 B2* | 6/2013 | Yang et al. | 248/455 |
| 8,477,493 B2* | 7/2013 | Wu et al. | 361/679.56 |
| D696,253 S* | 12/2013 | Akana et al. | D14/345 |
| 8,605,431 B2* | 12/2013 | Cheng et al. | 361/679.56 |
| 8,607,976 B2* | 12/2013 | Wu et al. | 206/320 |
| D698,543 S* | 2/2014 | Le Gette et al. | D3/218 |
| D703,659 S* | 4/2014 | Werth | D14/253 |
| 8,714,351 B2* | 5/2014 | Toulotte | 206/320 |
| 8,724,300 B2* | 5/2014 | Smith et al. | 361/679.01 |
| 8,749,960 B2* | 6/2014 | Mori | 361/679.03 |
| 8,766,921 B2* | 7/2014 | Ballagas et al. | 345/168 |
| 8,770,538 B2* | 7/2014 | Hsu et al. | 248/685 |
| 8,800,763 B2* | 8/2014 | Hale | 206/320 |
| 8,800,937 B1* | 8/2014 | Lee et al. | 248/65 |
| 8,824,136 B1* | 9/2014 | Interian, III | G06F 1/1632 345/168 |
| 8,851,280 B2* | 10/2014 | Wen | A45C 11/00 206/320 |
| 8,941,988 B2 | 1/2015 | Ariga | |
| 9,101,188 B2* | 8/2015 | Magness | G06F 1/1656 |
| 2003/0002248 A1* | 1/2003 | Nakaya et al. | 361/683 |
| 2003/0052856 A1* | 3/2003 | Nakamura | G06F 1/1616 345/110 |
| 2005/0139740 A1* | 6/2005 | Chen et al. | 248/286.1 |
| 2005/0231930 A1* | 10/2005 | Jao | 361/807 |
| 2007/0217135 A1* | 9/2007 | Chuang et al. | 361/681 |
| 2008/0017541 A1 | 1/2008 | Kittayapong | |
| 2010/0072334 A1* | 3/2010 | Le Gette et al. | 248/176.3 |
| 2010/0090085 A1* | 4/2010 | Corrion | 248/459 |
| 2010/0213331 A1* | 8/2010 | Liou | 248/176.3 |
| 2011/0199727 A1* | 8/2011 | Probst | 361/679.09 |
| 2011/0253850 A1* | 10/2011 | Bau | H04M 1/04 248/176.3 |
| 2011/0284420 A1* | 11/2011 | Sajid | 206/576 |
| 2011/0297566 A1* | 12/2011 | Gallagher et al. | 206/320 |
| 2012/0012483 A1 | 1/2012 | Fan | |
| 2012/0037285 A1* | 2/2012 | Diebel et al. | 150/165 |
| 2012/0044638 A1* | 2/2012 | Mongan et al. | 361/679.55 |
| 2012/0125791 A1* | 5/2012 | Parker et al. | 206/45.2 |
| 2012/0140396 A1* | 6/2012 | Zeliff et al. | 361/679.09 |
| 2012/0170212 A1* | 7/2012 | Gallouzi et al. | 361/679.56 |
| 2012/0194448 A1* | 8/2012 | Rothkopf | 345/173 |
| 2012/0217174 A1* | 8/2012 | Ting | 206/45.2 |
| 2012/0218693 A1 | 8/2012 | Ariga | |
| 2012/0325689 A1* | 12/2012 | Wibby et al. | 206/45.2 |
| 2013/0020215 A1* | 1/2013 | Hsu | F16M 11/041 206/320 |
| 2013/0114198 A1* | 5/2013 | Gengler | 361/679.08 |
| 2013/0134061 A1* | 5/2013 | Wu et al. | 206/320 |
| 2013/0214661 A1* | 8/2013 | McBroom | 312/325 |

FOREIGN PATENT DOCUMENTS

| | | |
|---|---|---|
| JP | 2003168876 A | 6/2003 |
| JP | 2007-127980 A | 5/2007 |
| JP | 2008027417 A | 2/2008 |
| JP | 2012043182 A | 3/2012 |
| JP | 2012182198 A | 9/2012 |
| TW | 200737901 A | 10/2007 |

OTHER PUBLICATIONS

Chinese Office Action (and English translation thereof) dated Mar. 23, 2016, issued in counterpart Chinese Application No. 201310317201.X.

* cited by examiner

ELECTRONIC DEVICE

CROSS-REFERENCE TO RELATED APPLICATION

This application is based upon and claims the benefit of priority from the prior Japanese Patent Application No 2012-165362, filed Jul. 26, 2012, the entire contents of which are incorporated herein by reference.

BACKGROUND OF THE INVENTION

1. Field of the Invention

The present invention relates to a flat-type electronic device such as a portable information terminal machine.

2. Description of the Related Art

For example, a flat-type electronic device is known that is structured to include a case cover section where the device body is placed and a lid cover section rotatably mounted on the case cover section to cover the front surface of the device body, as described in Japanese Patent Application Laid-Open (Kokai) Publication No. 2007-127980.

This type of electronic device is structured such that the lid cover section rotates to openably and closably cover the front surface of the device body, with the device body being accommodated in the case cover section formed approximately in a box or frame shape.

However, with this protective cover, the case cover section covers the back surface side of the device body, and therefore there is an inconvenience in that an extended terminal provided on the back surface of the device body is hidden. In order to solve this inconvenience, in this electronic device, various openings are provided to expose the extended terminal provide on the back surface of the device body. However, this makes the shape of the case cover complex, which disadvantageously makes manufacture of the protective cover cumbersome.

SUMMARY OF THE INVENTION

The present invention is to simplify the structure of an electronic device, enhance its usability, and favorably protect the device body.

In accordance with one aspect of the present invention, there is provided an electronic device comprising: a cover body which openably and closably covers front surface of a flat-type device body; a support section which is capable of being stood up and laid down and mounted on the cover body; and a mount section which is bendably provided to the support section and mounted on the device body.

According to the present invention, it is possible to simplify the structure of an electronic device, enhance its usability, and favorably protect the device body.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF TIRE DRAWINGS

Figure 3:
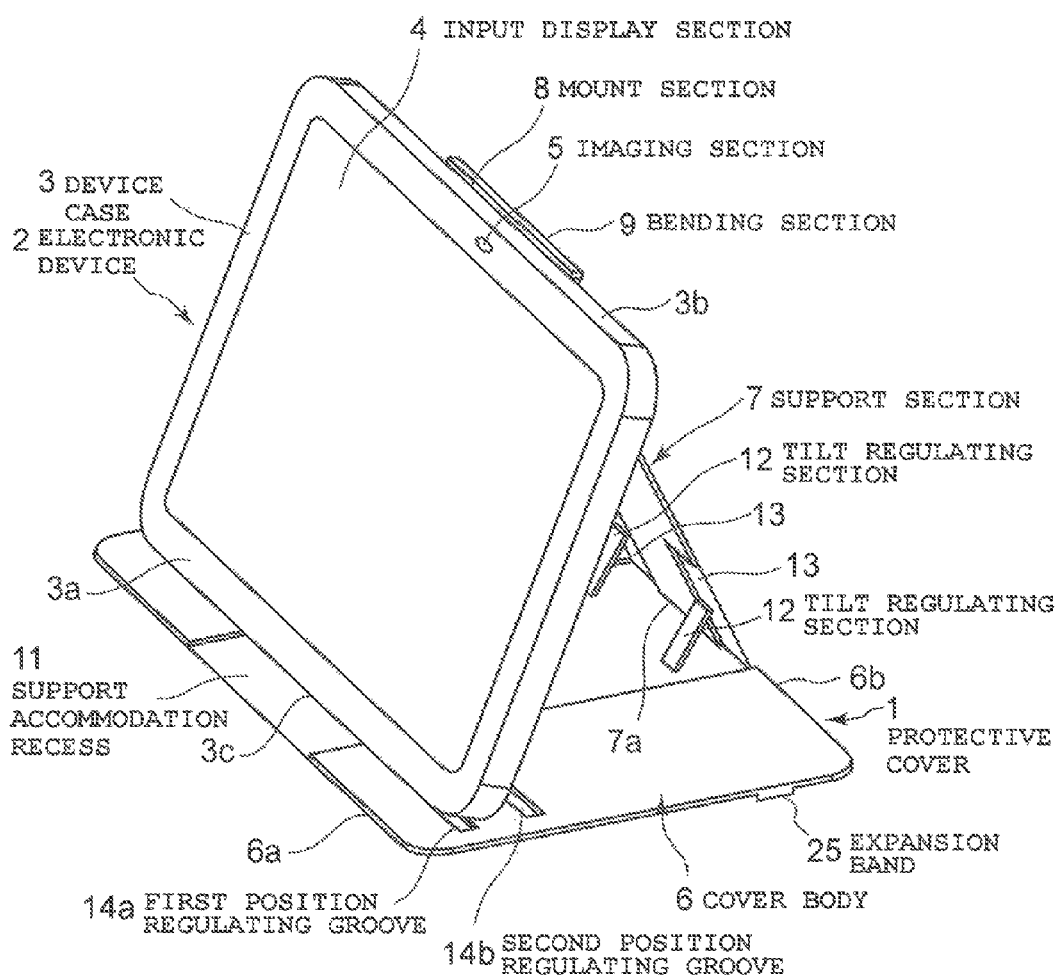
FIG. 3 is a perspective view depicting the state in which the device body has been leaned against the protective cover depicted in FIG. 1 and FIG. 2 for use.
Figure 5:
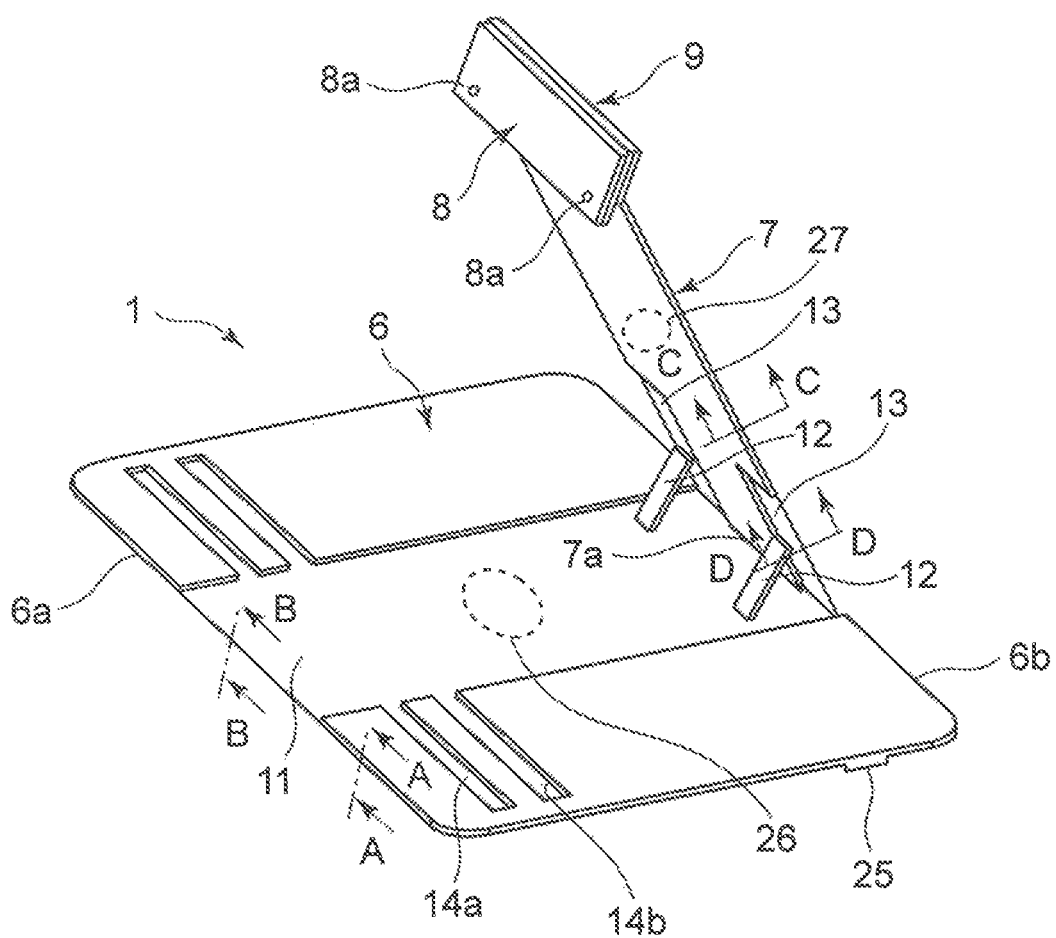
FIG. 5 is a perspective view depicting the state in which the device body has been removed from the protective cover depicted in FIG. 3.
Figure 6A:
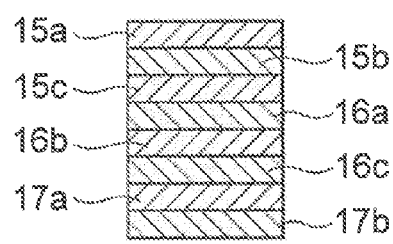
Figure 6B:
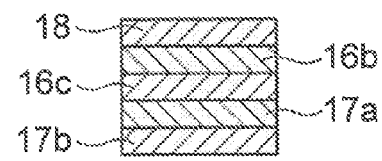
Figure 7A:
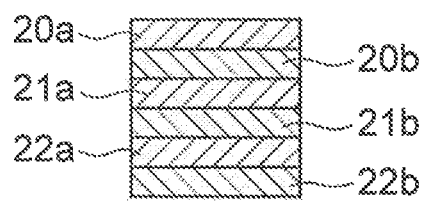
Figure 7B:
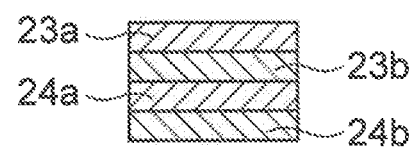
Figure 8:
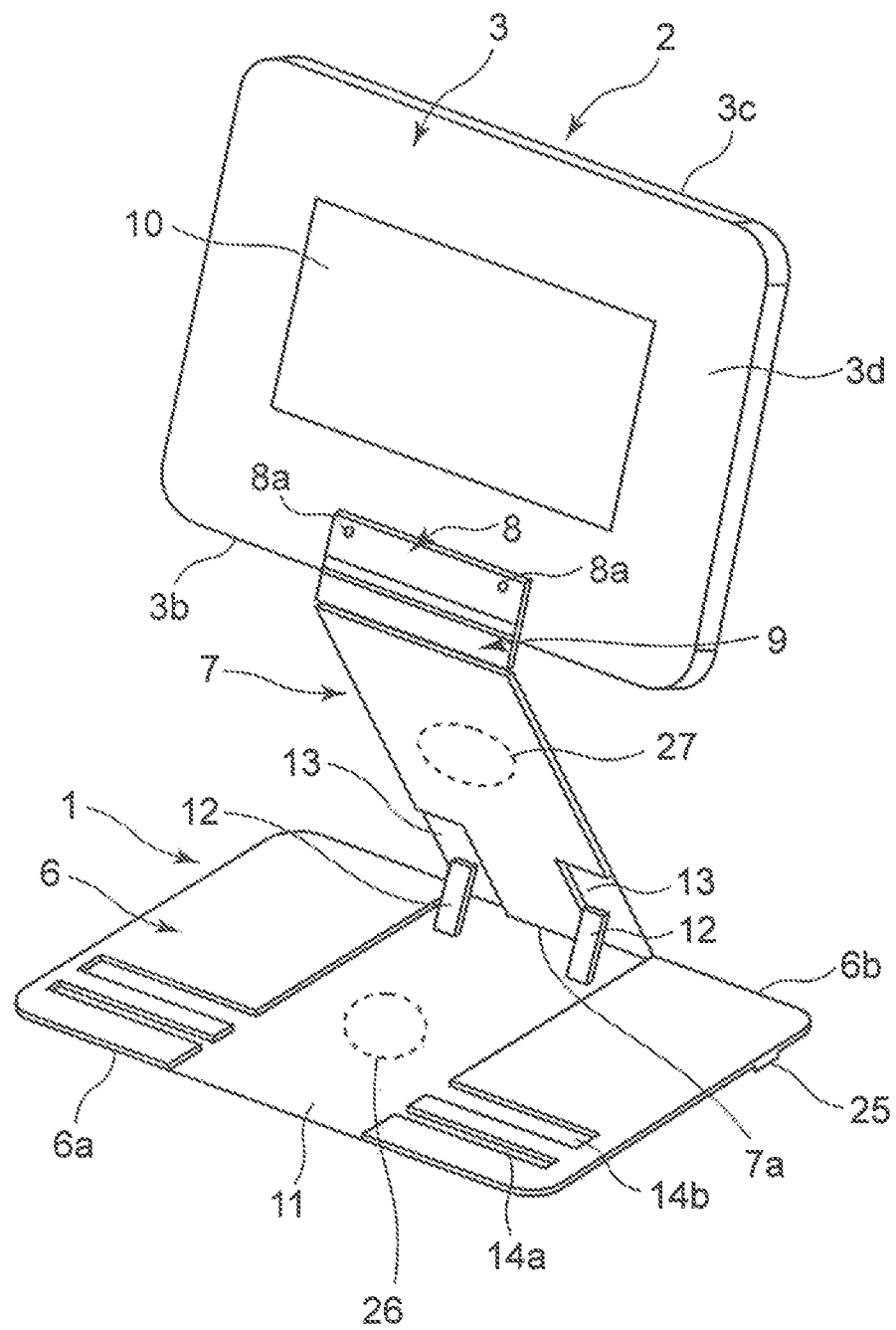
Figure 9:
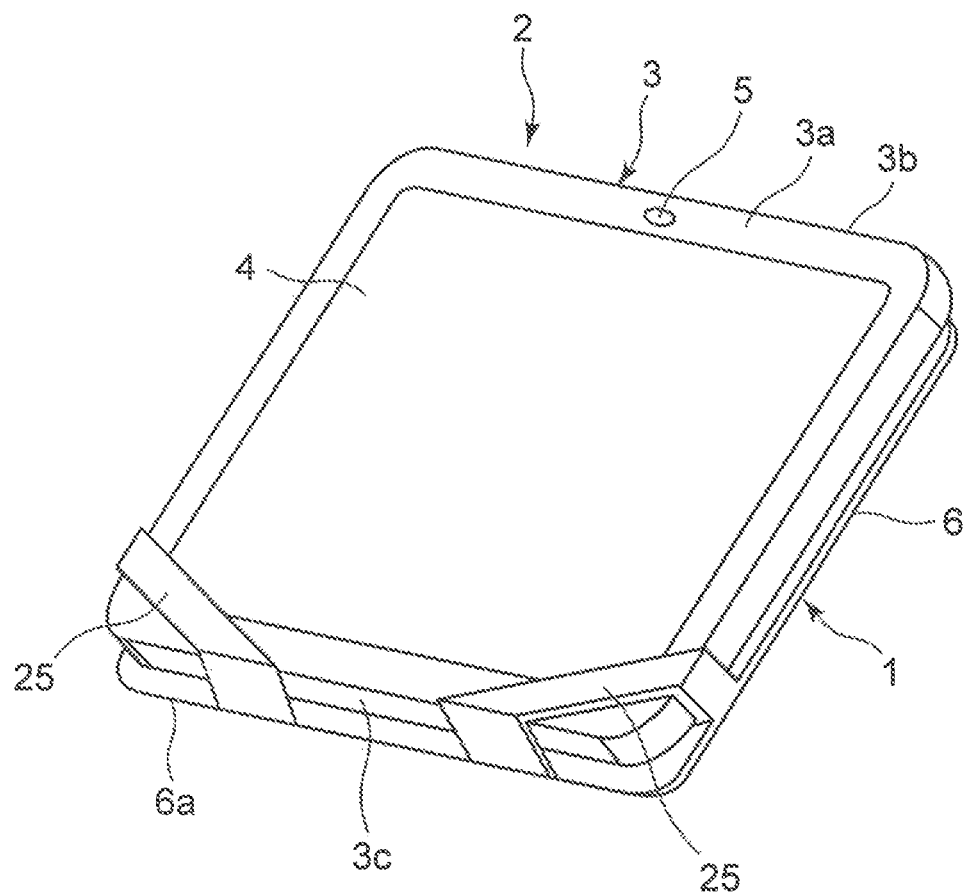
Figure 10:
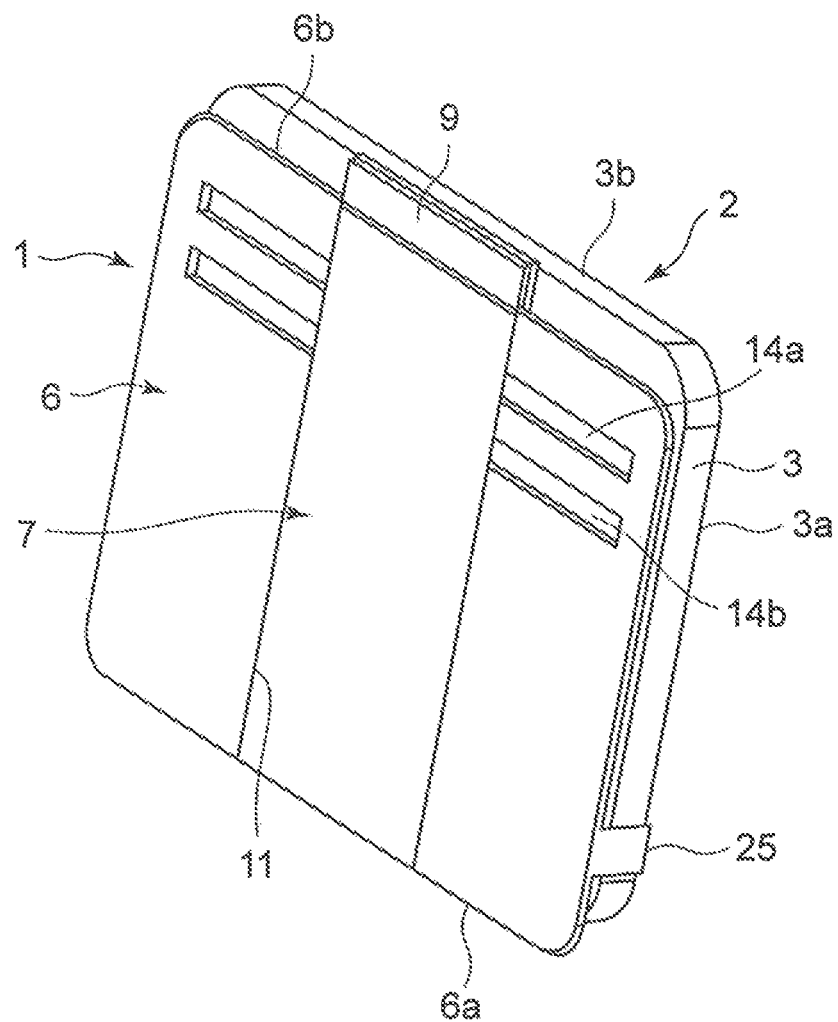

FIG. 6A and FIG. 6B each depict a cross section of the cover body of the protective cover depicted in FIG. 5, of which FIG. 6A is an enlarged sectional view of the main section taken along line A-A in FIG. 5, and FIG. 6B is an enlarged sectional view of the main section taken along line B-B in FIG. 5;

FIG. 7A and FIG. 7B each depict a cross section of a support section in the protective cover depicted in FIG. 5, of which FIG. 7A is an enlarged sectional view of the main section taken along line C-C in FIG. 5, and FIG. 7B is an enlarged sectional view of the main section taken along line D-D in FIG. 5;

FIG. 8 is a perspective view depicting the protective cover depicted in FIG. 3, which is being unfolded for the device body to be leaned against it;

FIG. 9 is a perspective view depicting a state in which the cover body of the protective cover depicted in FIG. 8 has been placed on the back surface of the electronic device for the use of the device body; and FIG. 10 is a perspective view of the protective cover depicted in FIG. 9 when viewed from the back surface side.

DETAILED DESCRIPTION OF THE PREFERRED EMBODIMENTS

An electronic device according to an embodiment of the present invention is described below with reference to FIG. 1 to FIG. 10.

Figure 1:
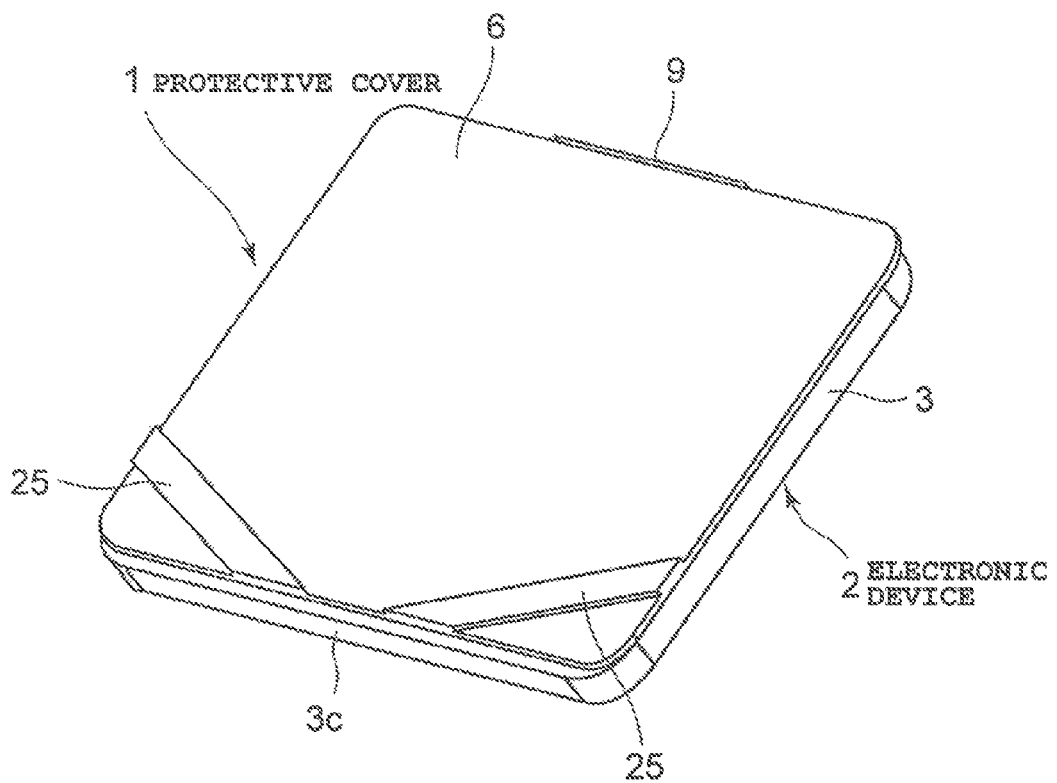
FIG. 1 is a perspective view depicting an electronic device according to an embodiment of the present invention, in which the device body has been covered to be carried.
Figure 2:
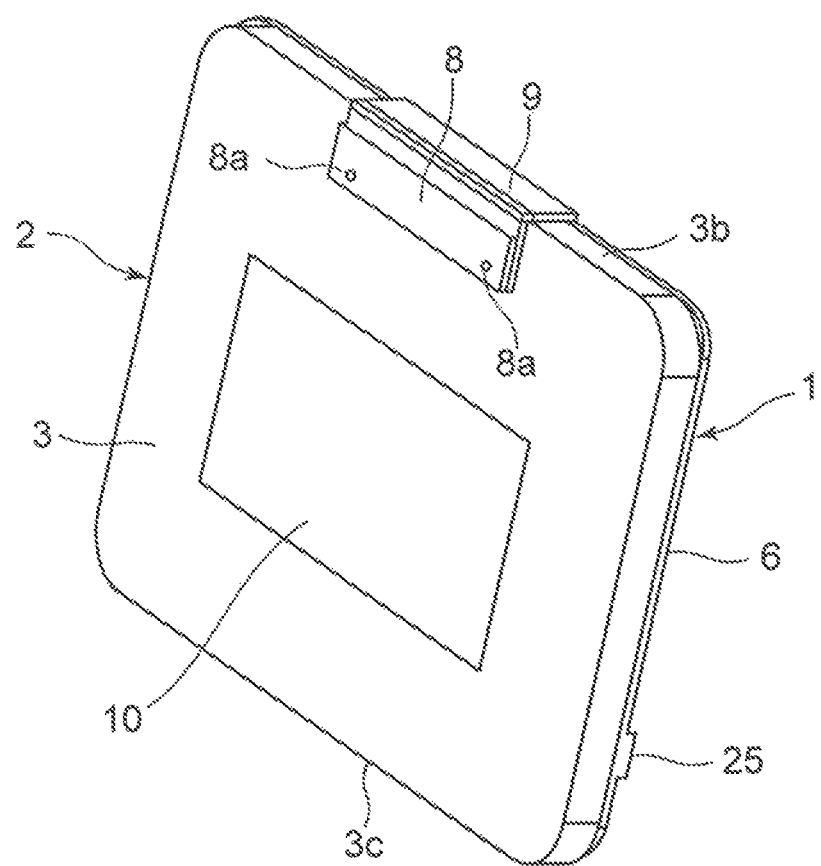
FIG. 2 is a perspective view of the back surface side of a protective cover when it is in the state depicted in FIG.

As depicted in FIG. 1 to FIG. 3, a protective cover 1 openably and closably covers the device body of a flat-type electronic device 2 for protection. In this case, the electronic device 2 is a portable information terminal machine such as a tablet terminal device, and includes a flat-plate device case 3.

The device case 3 has a front surface 3a provided with an input display section 4 and an imaging section 5 as depicted in FIG. 3. Also, as depicted in FIG. 2, the device case 3 has a back surface 3d provided with a battery pack 10 and an extension terminal (not shown). The input display section 4 has a display panel placed on the lower surface of a touch panel, and is placed over almost the entire area of the front surface 3a of the device case 3. The input display section 4 is configured so that when the touch panel is touched while information displayed on the display panel is being viewed, display contents are switched and other information is inputted.

The imaging section 5 is a digital camera section and, as depicted in FIG. 3, provided on the side of an upper side portion 3b of the front surface 3a of the device case 3.

The imaging section 5 is configured to image a subject such as a user positioned in front of the input display section 4.

Accordingly, the electronic device 2 is configured so that a teleconference or the like can be performed by the transmission of image data of a subject imaged by the imaging section 5.

As depicted in FIG. 2, the battery pack 10 is a flat-type rechargeable battery, and removably provided on the back surface 3d of the device case 3.

On the other hand, as depicted in FIG. 1 to FIG. 3, the protective cover 1 includes a cover body 6 which openably and closably covers the front surface 3a of the device case 3 of the electronic device 2, a support section 7 which is mounted on the cover body 6 such that it can be stood up and laid down, and a mount section 8 which is bendably provided to the support section 7 and mounted on a portion of the back surface 3d of device case 3.

In this case, the cover body 6 is formed in a flat plate shape approximately having the same size as that of the front surface 3a of the device case 3.

As depicted in FIG. 3 and FIG. 5, the support section 7 is formed in a rectangular plate shape smaller than the cover body 6.

That is, the support section 7 is formed such that its length in the front and back direction (vertical direction in FIG. 3) of the device case 3 is approximately equal to the length of the cover body 6 in the corresponding direction, and its length (a width) in the direction orthogonal thereto is shorter than the length of the cover body 6 in the direction corresponding to the lateral direction of the device case 3, such as approximately one third of the length of the cover body 6.

As depicted in FIG. 1 to FIG. 5, the mount section 8 is provided to a tip of the support section 7 via a bending section 9.

The mount section 8 is formed approximately in a rectangular shape smaller than the support section 7. That is, the mount section 8 is formed such that its length in the longitudinal direction is equal to the length of the support section 7 in the width direction, that is, the length in the direction orthogonal to the longitudinal direction of the support section 7, and its length in the width direction, that is, the length in the direction orthogonal to the longitudinal direction is short.

As depicted in FIG. 2, the mount section 8 is mounted with screws 8a on a portion on the upper side portion 3b side of the back surface 3d of the device case 3. In this case, the mount section 8 is made of hard synthetic resin such as ABS (Acrylonitrile Butadiene Styrene) resin or polycarbonate.

The bending section 9 is made of soft synthetic resin such as polyurethane, and is formed in a rectangle approximately equal in size to the mount section 8. Accordingly, the bending section 9 is structured to bendably couple the mount section 8 and the support section 7 together.

Figure 4:
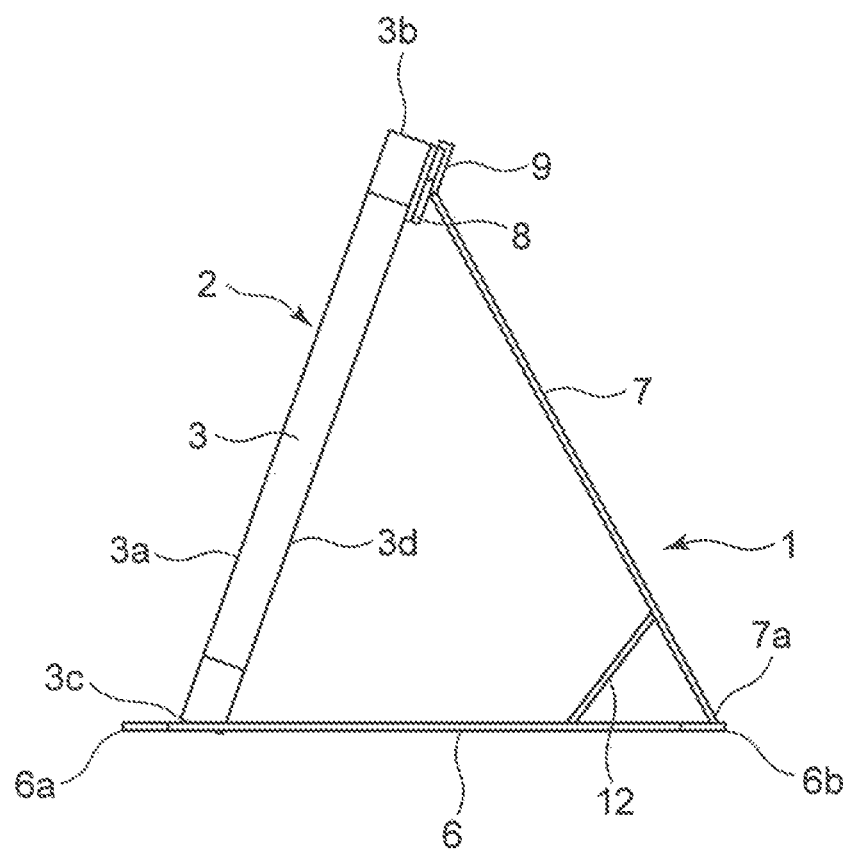
FIG. 4 is a side view of the protective cover when it is in the state depicted in FIG. 3.

As depicted in FIG. 3 to FIG. 5, the cover body 6 has a support accommodation recess 11 provided along the front and back direction (horizontal direction in FIG. 5) of the cover body 6, in which the support section 7 is removably accommodated.

The support accommodation recess 11 is formed to have a shape that is approximately the same as that of the support section 7 and a depth that is approximately equal to the thickness of the support section 7, and extends from a front end 6a (a left end in FIG. 5) to a rear end 6b (a right end in FIG. 5) of the cover body 6

As depicted in FIG. 3 to FIG. 5, in the support section 7, a coupling end 7a positioned opposite to the mount section 8 is bendably mounted by stitching on a portion at the rear end 6b of the cover body 6 in the support accommodation recess 11.

Accordingly, the support section 7 is structured to be stood up on the cover body 6 by the coupling end 7a being bent, and laid down to be accommodated in the support accommodation recess 11.

In this case, as depicted in FIG. 3 to FIG. 5, the support section 7 is structured so that, when it is stood up with respect to the cover body 6, the tilt of the support section 7 is regulated by paired tilt regulating sections 12.

That is, each of the paired tilt regulating sections 12 is a bendable band-shaped strap, and structured to have one end mounted on a portion slightly away from the rear end 6b in the support accommodation recess 11 toward the side of a front end 6b, and the other end mounted on a portion slightly away from the coupling end 7a of the support section 7 toward the mount section 3 side.

As a result, as depicted in FIG. 3 to FIG. 5, the paired tilt regulating sections 12 each have its mount position and length set so that the support section 7 is tilted at a predetermined tilt angle, for example, approximately sixty degrees, when the support section 7 is stood up with respect to the cover body 6.

Also, the paired tilt regulating sections 12 are each structured to be bent at an intermediate portion in a longitudinal direction such that the bent portions overlap with each other when the support section 7 is laid down to be placed in the support accommodation recess 11 of the cover body 6.

Accordingly, as depicted in FIG. 3 and FIG. 5, the support section 7 has paired regulating accommodation recesses 13 provided on the sides thereof which accommodate the paired tilt regulating sections 12.

That is, the paired regulating accommodation recesses 13 are provided on both sides of the support section 7 on the coupling end 7a side facing the support accommodation recess 11 of the cover body 6.

As a result, the paired regulating accommodation recesses 13 are structured such that the paired tilt regulating sections 12 are bent and the bent portions are overlapped with each other when the support section 7 is laid down to be placed in the support accommodation recess 11 of the cover body 6, and the paired tilt regulating sections 12 in this state are accommodated in the paired regulating accommodation recesses 13, respectively.

As depicted in FIG. 3 and FIG. 5, the cover body 6 is provided with a first position regulating groove 14a and a second position regulating groove 14b for regulating the position of a lower side portion 3b of the device case 3 which is positioned above the cover body 6 when the device case 3 is leaned. The first position regulating groove 14a and the second position regulating groove 14b are provided in parallel with each other in a manner to be a predetermined distance away from each other in the front and back direction of the cover body 6.

In this case, as depicted in FIG. 5, the first position regulating groove 14a is provided at a position slightly away from the front end 6a toward the rear end 6b of the cover body 6 and in parallel with the front end 6a.

The second position regulating groove 14h is provided at a position slightly away from the first position regulating groove 14a toward the rear end 6b and in parallel with the front end 6a.

As depicted in FIG. 6A, the cover body 6 is structured to have a first front surface layer 15a, a second front surface layer 15b, a third front surface layer 15c, a first core 16a, an intermediate layer 16b, a second core 16c, a first back surface layer 17a, and a second back surface layer 17b laminated in the order from top to bottom.

The first front surface layer 15a is a sheet made of synthetic resin such as polyester (NYEX), the second front surface layer 15b is a cushioning material made of synthetic resin such as ethylene-vinyl acetate copolymer (EVA), and the third front surface layer 15c is a board made of synthetic resin such as polypropylene (PP).

The first core 16a is made of a paper material such as paperboard, and the intermediate layer 16b is a board made of synthetic resin such as polypropylene (PP). As with the first core 16*a*, the second core 16*b* is made of a paper material such as paperboard.

The first back surface layer 17*a* is a cushioning material such as polyurethane (PU) foam, and the second back surface layer 17*b* is synthetic leather made of synthetic resin such as polyurethane (PU).

Here, although each layer of the cover body 6 has the same thickness in FIG. 6A, each layer is formed to have a different thickness in practice.

For example, the second front surface layer 15*b* and the first back surface layer 17*a* are formed to be the thickest, the first core 16*a* and the second core 16*c* are formed to be slightly thinner than the second front surface layer 15*b* and the first back surface layer 17*a*, the third front surface layer 15*c* and the intermediate layer 16*b* are formed to be further thinner than the first core 16*a* and the second core 16*b*, and the first front surface layer 15*a* and the second back surface layer 17*b* are formed to be the thinnest.

As depicted in FIG. 6B, the support accommodation recess 11 of the cover body 6 is structured to have a first front surface layer 18, the intermediate layer 16*b*, the second core 16*c*, the first back surface layer 17*a*, and the second back surface layer 17*b* laminated in the order from top to bottom.

That is, the uppermost first front surface layer 18 of the support accommodation recess 11 is synthetic leather made of synthetic resin such as polyurethane (PU), and the intermediate layer 16*b* therebelow has the same structure as that of the cover body 6.

In this case, as depicted in FIG. 6B, the support accommodation recess 11 is formed thinner the cover body 6 by the thickness of the support section 7.

As with the cover body 6, the support accommodation recess 11 is formed so that each layer has a different thickness.

For example, the uppermost first front surface layer 18 is formed to have a thickness equal to that of the second back surface layer 17*b* and be the thinnest of all. The other layers are each formed to have a thickness equal to that of a corresponding layer of the cover body 6.

As depicted in FIG. 7A, the support section 7 is structured to have a first front surface layer 20*a*, a second front surface layer 20*b*, a first core 21*a*, a second core 21*b*, a first back surface layer 22*a*, and a second back surface layer 22*b* laminated in the order from top to bottom.

The first front surface layer 20*a* is a sheet made of synthetic resin such as polyester (NYEX), and the second front surface layer 20*b* is a board made of synthetic resin such as polypropylene (PP).

The first core 21*a* is made of a paper material such as paperboard. As with the first core 21*a*, the second core 21*b* is made of a paper material such as paperboard.

The first back surface layer 22*a* is a board made of synthetic resin such as polypropylene (PP), and the second back surface layer 22*b* is synthetic leather made of synthetic resin such as polyurethane (PU).

In this case as well, although each layer of the support section 7 has the same thickness in FIG. 7A, each layer is formed to have a different thickness in practice.

For example, the first core 21*a* and the second core 21*b* are formed to be the thickest, the second front surface layer 20*b* and the first back surface layer 22*a* are formed to be slightly thinner than the first core 21*a* and the second core 21*b*, and the first front surface layer 20*a* and the second back surface layer 22*b* are formed to be the thinnest.

As depicted in FIG. 7B, the regulating accommodation recesses 13 of the support section 7 are each structured to have a first front surface layer 23*a*, a second front surface layer 23*b*, a core 24*a*, and a back surface layer 24*b* laminated in the order from top to bottom.

The first front surface layer 23*a* is a sheet made of synthetic resin such as polyester (NYEX), and the second front surface layer 23*b* is a board made of synthetic resin such as polypropylene (PP).

The core 24*a* is made of a paper material such as paperboard, and the back surface layer 24*b* is synthetic leather made of synthetic resin such as polyurethane (PU).

In this case as well, the regulating accommodation recesses 13 are formed thinner than the support section 7 by a thickness formed by folding the tilt regulating sections 12, as depicted in FIG. 7B.

As with the support section 7, the regulating accommodation recesses 13 are each formed so that each layer has a different thickness.

For example, the core 24*a* is formed to be the thickest, the second front surface layer 23*b* is formed to be slightly thinner than the core 24*a*, and the first front surface layer 23*a* and the back surface layer 24*b* are formed to be the thinnest.

As depicted in FIG. 1 and FIG. 9, corners of the back surface of the cover body 6 are provided with paired expansion bands 25 which removably engage with corners of the device case 3.

These paired expansion bands 25 are rubber bands, and provided at both corners of the rear end 6*b* of the cover body 6 where the coupling end 7*a* of the support section 7 is positioned.

As a result, as depicted in FIG. 9, the paired expansion bands 25 are placed by expanding and contracting over one of the front or back surfaces of the cover body 6, and thereby removably engage corners of the device case 3.

As depicted in FIG. 5 and FIG. 8, the support accommodation recess 11 and the support section 7 of the cover body 6 are provided with first and second magnets 26, 27, respectively.

The first magnet 26 is embedded in approximately the center of the support accommodation recess 11 of the cover body 6.

The second magnet 27 is embedded in approximately the center of the support section 7, and corresponds to the first magnet 26 when the support section 7 is accommodated in the support accommodation recess 11 of the cover body 6.

Next, the operation of the protective cover 1 is described.

First, in a case where the device body of the electronic device 2 is covered by the protective cover 1 and carried, the coupling end 7*a* of the support section 7 is bent to accommodate the support section 7 in the support accommodation recess 11 of the cover body 6.

Then, the first magnet 26 embedded in the support accommodation recess 11 of the cover body 6 and the second magnet 27 embedded in the support section 7 attach to each other by their magnetic forces, and thereby fix the support section 7 in the support accommodation recess 11 of the cover body 6.

Here, the tilt regulating sections 12 are each folded into two and accommodated in the regulating accommodation recess 13 of the support section 7.

Also, the mount section 8 and the bending section 9 are placed projecting from the front end 6*a* of the cover body 6.

In this state, the bending section 9 is bent from the front surface 3*a* side toward the back surface 3*d* side of the device case 3 to fold the mount section 8.

As a result, the mount section 8 is positioned away from the support section 7 via the device case 3, and the device case 3 has its front and back surfaces reversed, with the front surface 3*a* of the device case 3 facing the cover body 6 of the protective cover 1 and the front surface 3a of the device case 3 being covered by the cover body 6, as depicted in FIG. 2.

Here, even if the paired expansion bands 25 have been positioned on the back surface of the cover body 6, since the rear end 6b of the cover body 6 and the coupling end 7a of the support section 7 have been coupled together, the rear end 6b of the cover body 6 and the lower side portion 3c of the device case 3 do not freely move away from each other and opened.

Accordingly, it is not necessarily required to expand and engage the paired expansion bands 25 with corners of the device case 3 as depicted in FIG. 1.

In this state, the input display section 4 and the imaging section 5 positioned on the front surface 3a of the device case 3 are being covered by the cover body 6 for protection.

As a result the electronic device 2 can be safely and favorably carried. Also, since the back surface 3d of the device case 3 is being exposed, the battery pack 10 can be easily replaced, or a cable or the like can be connected to the extension terminal (not shown).

Next, the case is described in which the device body of the electronic device 2 is leaned against the protective cover 1 for use.

In this case, first, the support section 7 is pulled up from the inside of the support accommodation recess 11 of the cover body 6, as depicted in FIG. 8.

Here, the support section 7 is pulled to stand against the magnetic forces of the first magnet 26 embedded in the support accommodation recess 11 of the cover body 6 and the second magnet 27 embedded in the support section 7.

As a result, the support section 7 stands on the cover body 6 with its coupling end 7a being bent, as depicted in FIG. 8.

Here, the folded paired tilt regulating sections 12 are unfolded by gradually extending along with the standing of the support section 7. By these developed paired tilt regulating sections 12, the tilt of the support section 7 with respect to the cover body 6 is regulated at a predetermined tilt angle such as approximately sixty degrees.

In this state, when the device case 3 is pushed upward, the device case 3 makes a rotational movement upward to stand above the support section 7 as the bending section 9 bends.

Then, when the bending section 9 is further bent to cause the device case 3 to make a rotational movement ahead of the support section 7, the device case 3 is reversed upside down by the bending section 9, as depicted in FIG. 3.

Here, the front and back surfaces of the device case 3 are reversed, and the mount section 8 mounted on the back surface 3d of the device case 3 is overlapped with the bending section 9, whereby the lower side portion 3c of the device case 3 is placed on the cover body 6, and the device case 3 is supported by the supporting section 7.

In this state, with the imaging section 5 of the device case 3 being positioned above and the lower side portion 3c of the device case 3 positioned opposite thereto being placed on the cover body 6, the device case 3 is diagonally tilted and leaned by the support section 7, as depicted in FIG. 3.

Here, an edge of the lower side portion 3c of the device case 3 is selectively engaged with one of the first position regulating groove 14a and the second position regulating groove 14b provided on the cover body 6, whereby the tilt angle of the device case 3 is adjusted.

For example, when the edge of the lower side portion 3c of the device case 3 is engaged with the first position regulating groove 14a of the cover body 6, the device case 3 is tilted to a slight tilt angle so as to be loaned.

Also, when the edge of the lower side portion 3c of the device case 3 is engaged with the second position regulating groove 14b of the cover body 6, the device case 3 is tilted to a steep tilt angle so as to be leaned.

Moreover, when the edge of the lower side portion 3c of the device case 3 is placed on the upper surface of the cover body 6 positioned on the rear end 6b side of the cover body 6 with respect to the second position regulating groove 14b, the device case 3 is tilted to a steeper tilt angle so as to be leaned.

As such, by the device case 3 being diagonally leaned against the protective cover 1, the electronic device 2 can be used for a teleconference.

Here, the user is positioned in front of the device case 3 and imaged by the imaging section 5. While image data obtained by the imaging is being transmitted, image data of a meeting counterpart is received and displayed on the input display section 4 for a teleconference.

Also, by the device case 3 being diagonally leaned against the protective cover 1, the electronic device 2 can be used as a presentation terminal.

Here, the user viewing a presentation is positioned in front of the device case 3 and presentation contents are displayed on the input display section 4. In this manner, the electronic device 2 can be used as a presentation terminal.

Next, the case is described in which the electronic device 2 is held with one hand for performing an input operation.

In this case, firstly, in the state depicted in FIG. 3, the lower side portion 3c of the device case 3 is lifted above the cover body 6 to move the device case 3 ahead of the cover body 6, and the support section 7 is accommodated in the support accommodation recess 11 of the cover body 6.

As a result, the first magnet 26 embedded in the support accommodation recess 11 of the cover body 6 and the second magnet 27 embedded in the support section 7 attach to each other by their magnetic forces, and thereby fix the support section 7 in the support accommodation recess 11 of the cover body 6.

In this state, with the bending section 9 being bent to be folded from above the front end 6a of the cover body 6 toward the underside of the front end 6a, the device case 3 is rotated to move toward the back surface of the cover body 6.

As a result, the front and back surfaces of the device case 3 are reversed, and the back surface 3d of the device case 3 is opposed to and overlapped with the back surface of the cover body 6 with the front surface 3a of the device case 3 being exposed, as depicted in FIG. 9 and FIG. 10.

Here, since the lower side portion 3c of the device case 3 and the front end 6a of the cover body 6 are not fixed, the lower side portion 3c of the device case 3 and the front end 6a of the cover body 6 may move away from each other.

To address this problem, as depicted in FIG. 9, the expansion bands 25 provided on corners of the cover body 6 are expanded to be engaged with corners of the device case 3, whereby the device case 3 is fixed to the cover body 6.

In this state, the device case 3 has been fixed to the cover body 6 with the input display section 4 and the imaging section 5 of the device case 3 being exposed, as depicted in FIG. 9. Accordingly, the input display section 4 can be touched and a subject can be imaged by the imaging section 5 while the device case 3 and the cover body 6 are being pinched and held with one hand and information displayed on the input display section 4 is being viewed, whereby the electronic device 2 can be favorably used.

As such, the protective cover 1 includes the cover body 6 which operably and closably covers the front surface 3a of the flat-type electronic device 2, the support section 7 which is mounted on the cover body 6 such that it can be stood up and laid down, and the mount section 6 which is bendably provided to the support section 7 and mounted on the electronic device 2. As a result, the structure of the electronic device 2 can be simplified, its usability can be enhanced, and the device body can be favorably protected.

That is, with the protective cover 1, the front surface 3a of the device case 3 of the electronic device 2 can be covered by the cover body 6 for protection, and the device case 3 can be used with it being leaned by the support section 7 standing on the cover body 6. In addition, the back surface 3d of the device case 3 can be opened.

As a result, the usability of the electronic device 2 can be enhanced, and the electronic device 2 can be favorably protected.

In this case, the electronic device of the present embodiment has a structure in which the support section 7 is mounted such that it can be stood up and laid down on the cover body 6 for openably and closably covering the front surface 3a of the electronic device 2, the mount section 8 is bendably provided to the support section 7, and the electronic device 2 is mounted on the mount section 8. Therefore, not only the structure is simple but also the back surface 3d of the device case 3 can be opened. As a result, the battery pack 10, the extension terminal (not shown), and the like can be exposed, whereby the replacement of the battery pack 10, the connection of the extension terminal, and the like can be easily made. Thus, the electronic device of the present embodiment is user-friendly.

Also, in the electronic device of the present embodiment, the support accommodation recess 11 which removably accommodates the support section 7 is provided to the cover body 6. Accordingly, in a case where the electronic device 2 is carried with it being protected by the protective cover 1 or a case where the electronic device 2 and the protective cover 1 are held with one hand for use, the support section 7 can be accommodated in the support accommodation recess 11 of the cover body 6, whereby the electronic device 2 can be compactly and favorably carried and used.

That is, in the electronic device of the present embodiment, when the electronic device 2 is to be carried with it being protected by the protective cover 1, the support section 7 is accommodated in the support accommodation recess 11 of the cover body 6, and as a result the front surface of the cover body 6 and the front surface of the support section 7 are placed on the same plane. Therefore, the front surface 3a of the device case 3 can be brought into close contact with the front surface of the cover body 6, whereby the electronic device 2 can be favorably and compactly protected by the protective cover 1.

Moreover, in the electronic device of the present embodiment, when the electronic device 2 is to be used with it being held with one hand together with the protective cover 1, the support section 7 is accommodated in the support accommodation recess 11 of the cover body 6, and as a result the front surface of the cover body 6 and the front surface of the support section 7 are placed on the same plane. Therefore, the back surface 3d of the device case 3 can be brought into close contact with the back surface of the cover body 6, whereby the electronic device 2 can be favorably and compactly protected by the protective cover 1.

Furthermore, the electronic device of the present embodiment includes the paired tilt regulating sections 12 which regulate the tilt of the support section 7 when the support section 7 is stood up with respect to the cover body 6. Accordingly, the support section 7 can be stood up at a predetermined tilt angle, such as approximately sixty degrees, by the paired tilt regulating sections 12 when the support section 7 is stood up on the cover body 6. Thus, the device case 3 can be reliably and favorably tilted in a stable state when the electronic device 2 is used with it being leaned.

In this case, each of the paired tilt regulating sections 12 is a bendable band-shaped strap. Accordingly, the paired tilt regulating sections 12 can be compactly folded when the support section 7 is accommodated in the support accommodation recess 11 of the cover body 6.

Also, the support section 7 is provided with the regulating accommodation recesses 13 which accommodate the tilt regulating sections 12. Accordingly, the tilt regulating sections 12 can be compactly folded, and reliably and favorably accommodated in the regulating accommodation recesses 13 when the support section 7 is accommodated in the support accommodation recess 11 of the cover body 6. As a result, the support section 7 can be favorably accommodated in the support accommodation recess 11 of the cover body 6.

Still further, in the electronic device of the present embodiment, the cover body 6 is provided with the first position regulating groove 14a and the second position regulating groove 14b which regulate the position of the lower side portion 3b of the device case 3 of the electronic device 2 when the device body of the electronic device 2 is leaned. Accordingly, the edge of the lower side portion 3c of the device case 3 can be selectively engaged with one of the first position regulating groove 14a and the second position regulating groove 14b of the cover body 6, whereby the tilt angle of the device case 3 can be favorably adjusted.

For example, when the edge of the lower side portion 3c of the device case 3 is engaged with the first position regulating groove 14a of the cover body 6, the device case 3 can be tilted to a slight tilt angle so as to be leaned.

Also, when the edge of the lower side portion 3c of the device case 3 is engaged with the second position regulating groove 14b of the cover body 6, the device case 3 can be tilted to a steep tilt angle so as to be leaned.

Moreover, when the edge of the lower side portion 3c of the device case 3 is placed on the upper surface of the cover body 6 with respect to the second position regulating groove 14b, the device case 3 can be tilted to a steeper tilt angle so as to be leaned.

Yet still further, in the electronic device of the present embodiment, corners of the cover body 6 are each provided with the expansion band 25 which removably engages with a corresponding corner of the electronic device 2. Accordingly, in a state where the back surface 3d of the device case 3 is being opposed to and overlapped with the back surface of the cover body 6 with the front surface 3a of the device case 3 exposed, the expansion bands 25 can be expanded to be engaged with the corners of the device case 3.

As a result of this structure, the device case 3 can be reliably and favorably fixed to the cover body 6, whereby the input display section 4 on the exposed front surface 3a of the device case 3 can be touched while the device case 3 is being held with one hand together with the cover body 6, and a subject can be favorably imaged by the imaging section 5 on the exposed front surface 3a of the device case 3.

Also, in this case, in a state where the front surface 3a of the device case 3 is being opposed to and overlapped with the front surface of the cover body 6 with the back surface 3d of the device case 3 opened, the expansion bands 25 of the cover body 6 can be expanded to be engaged with the corners of the device case 3. Thus, even in a state where the front surface 3a of the device case 3 is being protected by the cover body 6, the device case 3 can be reliably and favorably fixed to the cover body 6. By this structure as well the electronic device 2 can be favorably carried.

Yet still further, in the electronic device of the present embodiment, the first and the second magnets 26 and 27 which attach to each other by their magnetic forces are provided in the cover body 6 and the support section 7, respectively. Accordingly, when the support section 7 is accommodated in the support accommodation recess 11 of the cover body 6, the first magnet 26 of the cover body 6 and the second magnet 27 of the support section 7 attach to each other by their magnetic forces, whereby the support section 7 is reliably fixed to the support accommodation recess 11 of the cover body 6.

Thus, in a case where the electronic device 2 is carried with the front surface 3a of the device case 3 being opposed to and overlapped with the front surface of the cover body 6, the electronic device 2 can be favorably carried with it being fixed to the cover body 6. Also, in a case where the electronic device 2 is used with the back surface 3d of the device case 3 being opposed to and overlapped with the back surface of the cover body 6 and the device case 3 being held with one hand together with the cover body 6, the electronic device 2 can be favorably used with it being fixed to the cover body 6.

In the above-described embodiment, the mount section 8 of the protective cover 1 is mounted on the back surface 3d of the device case 3. However, the mount section 8 is not necessarily required to be mounted on the back surface 3d of the device case 3, and may be mounted on a side surface of the device case 3 or an edge of the front surface 3a of the device case 3.

Also, in the above-described embodiment, the present invention has been applied to a portable information terminal machine such as a tablet terminal device as the electronic device 2. However, the present invention is not limited thereto, and may be applied to a flat-type electronic device having a keyboard section and a display section arranged on a plane. As long as it is structured to include the imaging section 5 on the front surface, the present invention can be applied.

While the present invention has been described with reference to the preferred embodiments, it is intended that the invention be not limited by any of the details of the description therein but includes all the embodiments which fall within the scope of the appended claims.

What is claimed is:

1. An electronic device comprising:
    a cover body which openably and closably covers a front surface of a flat-type device body;
    a support section which is operable to be stood up and laid down, and which is mounted on the cover body;
    a mount section which is bendably coupled to the support section, and which is mounted on the device body;
    a tilt regulating section which is mounted on the support section and which regulates a tilt of the support section with respect to the cover body when the support section is stood up with respect to the cover body;
    an accommodation recess which is provided in a surface of the cover body and which removably accommodates the support section; and
    a plurality of position regulating grooves which are respectively provided in both of side areas of the surface of the cover body, the side areas of the surface of the cover body being different from an area of the surface of the cover body in which the accommodation recess is provided,
    wherein each of said position regulating grooves receives and engages a lower end portion of the device body and thereby regulates a position of the device body when the lower end portion of the device body is leaned thereagainst.

2. The electronic device according to claim 1, wherein the cover body has a corner provided with an expansion band which removably engages with a corresponding corner of the device body.

3. The electronic device according to claim 1, wherein the cover body and the support section are provided with magnets which attach to each other by a magnetic force.

4. A protective cover comprising:
    a cover body which openably and closably covers a front surface of a flat-type electronic device;
    a support section which is operable to be stood up and laid down, and which is mounted on the cover body;
    a mount section which is bendably coupled to support section and mounted on the device body;
    a tilt regulating section which is mounted on the support section and which regulates a tilt of the support section with respect to the cover body when the support section is stood up with respect to the cover body;
    an accommodation recess which is provided in a surface of the cover body and which removably accommodates the support section; and
    a plurality of position regulating grooves which are respectively provided in both of side areas of the surface of the cover body, the side areas of the surface of the cover body being different from an area of the surface of the cover body in which the accommodation recess is provided,
    wherein each of said position regulating grooves is configured to receive and engage a lower end portion of the device body and thereby regulate a position of the device body when the lower end portion of the device body is leaned thereagainst.

5. A protective cover comprising:
    a cover body which openably and closably covers a front surface of a flat-type electronic device;
    a support section which is operable to be stood up and laid down, and which is mounted on the cover body;
    a mount section which is bendably coupled to the support section and mounted on an end portion of a back surface side of the electronic device such that the back surface side of the electronic device is exposed;
    an accommodation recess which is provided in a surface of the cover body and which removably accommodates the support section; and
    a plurality of position regulating grooves which are respectively provided in both of side areas of the surface of the cover body, the side areas of the surface of the cover body being different from an area of the surface of the cover body in which the accommodation recess is provided,
    wherein each of said position regulating grooves is configured to receive and engage a lower end portion of the device body and thereby regulate a position of the device body when the lower end portion of the device body is leaned thereagainst.

* * * * *